United States Patent
Stadler et al.

(10) Patent No.: US 9,278,619 B2
(45) Date of Patent: Mar. 8, 2016

(54) VEHICLE AND METHOD FOR SECURELY DISCONNECTING HIGH-VOLTAGE-GENERATING DEVICES IN THE EVENT OF AN ACCIDENT

(71) Applicant: AUDI AG, Ingolstadt (DE)

(72) Inventors: Michael Stadler, Arnsberg (DE); Juergen Hladik, Ingolstadt (DE); Marco Thoemmes, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/395,302

(22) PCT Filed: Feb. 23, 2013

(86) PCT No.: PCT/EP2013/000530
§ 371 (c)(1),
(2) Date: Oct. 17, 2014

(87) PCT Pub. No.: WO2013/159848
PCT Pub. Date: Oct. 31, 2013

(65) Prior Publication Data
US 2015/0057865 A1     Feb. 26, 2015

(30) Foreign Application Priority Data

Apr. 28, 2012   (DE) .......................... 10 2012 008 680

(51) Int. Cl.
*B60L 9/00*     (2006.01)
*H02J 7/00*     (2006.01)
(Continued)

(52) U.S. Cl.
CPC ............. *B60L 3/0007* (2013.01); *B60L 3/0061* (2013.01); *B60L 3/0069* (2013.01); *B60L 3/04* (2013.01); *B60L 3/12* (2013.01); *B60L 2240/547* (2013.01)

(58) Field of Classification Search
USPC .............................. 701/22; 320/136; 307/10.1
See application file for complete search history.

(56) References Cited

U.S. PATENT DOCUMENTS

| | | | |
|---|---|---|---|
| 5,816,358 | A | 10/1998 | Adler et al. |
| 2003/0000759 | A1 | 1/2003 | Schmitz et al. |

(Continued)

FOREIGN PATENT DOCUMENTS

| | | |
|---|---|---|
| DE | 43 23 604 A1 | 1/1995 |
| DE | 199 50 008 A1 | 4/2001 |

(Continued)

OTHER PUBLICATIONS

WIPO English Language Translation of the International Preliminary Report on Patentability for PCT/EP2013/000530, mailed Oct. 30, 2014, 8 pages.

(Continued)

*Primary Examiner* — Thomas G Black
*Assistant Examiner* — Tyler Paige
(74) *Attorney, Agent, or Firm* — Staas & Halsey LLP

(57) ABSTRACT

A vehicle, in particular a motor vehicle, a hybrid vehicle or an electric vehicle, has a first device, which has at least one element, which can have an electric voltage which is hazardous to a human being in the event of such a human being coming into touching contact therewith. The first device is electrically connected to a conductor, which has a low voltage. An accident sensor system outputs a sensor signal in the event of an accident. On output of the sensor signal, the element of the first device can automatically be switched to zero potential.

19 Claims, 2 Drawing Sheets

(51) Int. Cl.
  *B60L 1/00* (2006.01)
  *B60L 3/00* (2006.01)
  *B60L 3/04* (2006.01)
  *B60L 3/12* (2006.01)

(56) References Cited

U.S. PATENT DOCUMENTS

| | | | |
|---|---|---|---|
| 2003/0136597 A1* | 7/2003 | Raftari et al. | 180/242 |
| 2003/0137193 A1 | 7/2003 | Belschner et al. | |
| 2004/0050610 A1* | 3/2004 | Kawasoe et al. | 180/282 |
| 2006/0055246 A1 | 3/2006 | Jansen et al. | |
| 2010/0044126 A1 | 2/2010 | Ohno | |
| 2010/0191425 A1 | 7/2010 | Murata et al. | |
| 2011/0166744 A1* | 7/2011 | Lu et al. | 701/34 |
| 2011/0288700 A1* | 11/2011 | Pebbles | 701/22 |
| 2012/0050067 A1* | 3/2012 | Otterson | 340/902 |
| 2012/0068532 A1* | 3/2012 | Tanabe et al. | 307/10.1 |
| 2012/0081221 A1 | 4/2012 | Doerr et al. | |
| 2013/0030621 A1* | 1/2013 | Chung et al. | 701/22 |
| 2013/0076405 A1* | 3/2013 | Ransom et al. | 327/109 |
| 2013/0106362 A1* | 5/2013 | Mackintosh et al. | 320/136 |
| 2013/0154352 A1* | 6/2013 | Tokarz et al. | 307/9.1 |
| 2013/0175999 A1* | 7/2013 | Thieme et al. | 320/136 |
| 2013/0206491 A1* | 8/2013 | Kor et al. | 180/65.225 |
| 2014/0046520 A1* | 2/2014 | Katoch et al. | 701/22 |
| 2014/0297152 A1* | 10/2014 | Kishida | 701/96 |
| 2015/0057865 A1* | 2/2015 | Stadler et al. | 701/22 |

FOREIGN PATENT DOCUMENTS

| | | |
|---|---|---|
| DE | 100 06 781 A1 | 3/2002 |
| DE | 10 2008 043 909 A1 | 5/2010 |
| DE | 11 2008 001 799 T5 | 5/2010 |
| DE | 10 2009 039 913 A1 | 6/2010 |
| DE | 10 2010 029 806 A1 | 12/2011 |
| DE | 10 2012 008 680.6 | 4/2012 |
| EP | 1 270 309 A1 | 1/2003 |
| WO | PCT/EP2013/000530 | 2/2013 |

OTHER PUBLICATIONS

Office Action issued Oct. 23, 2012 for corresponding German Patent Application No. 10 2012 008 680.6.
International Search Report mailed Mar. 28, 2013 for corresponding International Patent Application No. PCT/EP2013/000530.

* cited by examiner

VEHICLE AND METHOD FOR SECURELY DISCONNECTING HIGH-VOLTAGE-GENERATING DEVICES IN THE EVENT OF AN ACCIDENT

CROSS REFERENCE TO RELATED APPLICATIONS

This application is based on and hereby claims priority to International Application No. PCT/EP2013/000530 filed on Feb. 23, 2013 and German Application No. 10 2012 008 680.6 filed on Apr. 28, 2012, the contents of which are hereby incorporated by reference.

BACKGROUND

The present invention relates to a vehicle and to a method for the safe shutdown of high-voltage-generating devices in the event of an accident.

A so-called high-voltage system (HV system) is provided in hybrid and electric vehicles, for example, for supplying power to the electric motors used for driving the vehicle and for supplying power to the power electronics. In accordance with the present related art, there are often voltages in the range of approximately 300 to 600 V present in the conductors used for this high-voltage system and in electric cables which lead to a distribution device or charging socket outlet, etc.

Components or devices with such high voltages are used in vehicles in order to be able to keep the current intensity required for a specific required power low. As a result, comparatively small conductor cross sections can be realized, which has a favorable effect in respect of the required weight of the components or devices and therefore also in respect of the total weight of the vehicle.

In particular in the case of an extraordinary operating state of a vehicle, such as is provided, for example, in the event of or after an accident, it is necessary for the HV systems to be disconnected reliably from the voltage source.

In this regard, it is known to use, for example, an airbag control device as proof of a collision on the part of a vehicle or a collision with a vehicle. If a collision is established, the shutdown device for the HV systems can then be actuated via a free ignition channel in the airbag control device.

Thereupon, either the HV system itself is shut down or deactivated or the HV system can be disconnected from the power supply, for example by electrical disconnection of the HV battery from the electrical line.

Depending on the severity of the accident established, the HV systems can also be shut down in accordance with a multi-stage trigger concept. For example, preset trigger thresholds for the airbags (or more generally for the restraint systems) can be taken into consideration or used as trigger criteria, for example.

In other operating states of the vehicle which likewise provide shutdown of the HV systems but which cannot be established sufficiently safely by the airbag control device, for example in the case of a vehicle rollover, in the case of shut-down ignition but active HV systems (for example in the case of stationary air conditioning or when charging the rechargeable batteries), an additional sensor system and possibly an additional control device for actuating the shutdown device for the HV systems can be provided.

DE 10 2009 039 913 A1 discloses, for example, a motor vehicle having an HV system for driving the motor vehicle, a sensor system for providing a sensor signal and a control device for shutting down the HV system depending on the sensor signal, wherein the sensor system and the control device are used exclusively for shutting down the HV system in the motor vehicle. As a result, for example, different trigger thresholds for triggering an airbag or for shutting down an HV system can be realized.

Since under unfavorable circumstances the shutdown of HV systems may not operate, it is further known to warn individuals of a possible hazard due to live components or devices of the vehicle.

Thus, for example, DE 10 2008 043 909 A1 describes a vehicle, in particular a hybrid vehicle, having an electrical device connected to a high-voltage grid, which device has an impermissibly high voltage for touching contact by an individual. This vehicle has an alarm sensor which responds in the event of an accident and which is connected to a warning device for signaling the level of the voltage. If an accident with the vehicle arises, the alarm sensor responds, as a result of which the connected warning device signals the voltage level. All sensors which detect accident-typical configurations which do not arise during normal traveling operation of the vehicle are possible as alarm sensors.

SUMMARY

An potential object relates to providing a technical solution for safely isolating devices of a vehicle with which disadvantages of the related art are avoided.

The inventors propose a vehicle, in particular motor vehicle, hybrid vehicle or electric vehicle, which comprises
 a first device, which has at least one element, which can have an electric voltage which is hazardous to a human being in the event of such a human being coming into touching contact therewith, wherein
 the first device is electrically connected to a conductor, which has a low voltage, and
 an accident sensor system, which outputs a sensor signal in the event of an accident.

The vehicle is characterized by the fact that on output of the sensor signal, the element of the first device can automatically be switched to zero potential.

All of the solutions previously known from the related art merely envisage shutdown of HV systems, i.e. of systems which are supplied a high-voltage voltage supply, generally a high-voltage rechargeable battery.

However, components and devices which themselves operate on high voltages or generate high voltages are also used in vehicle, in particular also in conventional motor vehicles. Examples of this are a 230 V socket outlet or an ionizer. The voltage supply for such components and devices often has a low voltage which is non-hazardous to human beings, for example 12 volts DC, however.

In the event of an accident, such components and devices therefore represent a hazard to human beings since they can furthermore have at least one element which has an electric voltage which is hazardous to a human being in the event of such a human being coming into touching contact therewith. Deenergizing these components and devices in the event of an accident has not been provided in accordance with the solutions known from the related art. This disadvantage of the related art is overcome by the proposals.

In accordance with a first advantageous development, the vehicle is characterized by the fact that the hazardous electric voltage of the element of the first device is greater than 60 volts DC or greater than 25 volts AC.

And in accordance with a second advantageous development, the vehicle is characterized by the fact that the low voltage of the conductor is less than or equal to 60 volts DC or less than or equal to 25 volts AC. Furthermore, the low voltage of the conductor can be less than or equal to 24 volts DC, in particular less than or equal to 12 volts DC.

The specified voltage values should be interpreted such that they also include deviations from the specified values as generally occur during operation of vehicles and the devices and voltage sources (batteries, rechargeable batteries) used therein.

Furthermore, it may be advantageous if the accident sensor system has an acceleration sensor, rotation rate sensor and/or an airbag sensor. In addition, it is favorable if the first device is designed in such a way that it can automatically switch the element to zero potential on output of the sensor signal. A similar situation applies to the development which envisages that the vehicle furthermore has a control device, which is designed in such a way that it can automatically switch the element of the first device to zero potential on output of the sensor signal.

Furthermore, it may be provided in the case of the vehicle that even when ignition is switched off, the accident sensor system and possibly the control device are activatable, and the element of the first device can automatically be switched to zero potential.

It is also advantageous if the vehicle furthermore has a vehicle bus system, and the sensor signal is transmittable via the vehicle bus system and is usable for the automatic switching to zero potential of the element of the first device.

In accordance with yet a further development, the vehicle furthermore comprises at least one second device, which has at least one element, which can have an electric voltage which is hazardous to a human being in the event of such a human being coming into touching contact therewith, and which is electrically connected to a high-voltage conductor with an electric voltage of greater than 60 volts DC or greater than 25 volts AC. In accordance with this development, the vehicle is characterized by the fact that on output of the sensor signal, the element of the second device can automatically be switched to zero potential.

The inventors also propose a method for switching to zero potential a first device of a vehicle, in particular a motor vehicle, a hybrid vehicle or an electric vehicle, wherein the first device has at least one element, which can have an electric voltage which is hazardous to a human being in the event of such a human being coming into touching contact therewith, and wherein the first device is electrically connected to a conductor, which has a low voltage, and wherein the vehicle has an accident sensor system, which outputs a sensor signal in the event of an accident, wherein the method comprises:

outputting of a sensor signal by the accident sensor system provided in the vehicle in the event of an accident, and automatically switching the element to zero potential.

BRIEF DESCRIPTION OF THE DRAWINGS

These and other objects and advantages of the present invention will become more apparent and more readily appreciated from the following description of the preferred embodiments, taken in conjunction with the accompanying drawings of which.

The illustrations in the drawings are purely schematic and not true to scale. Identical or similar elements have been provided with the same reference symbols within the drawings.

DETAILED DESCRIPTION OF THE PREFERRED EMBODIMENT

Figure 1:
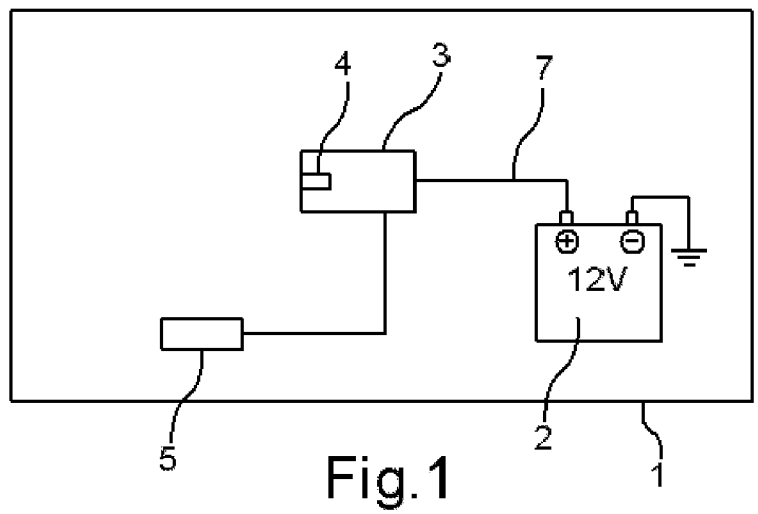
FIG. 1 shows a first embodiment of the proposed vehicle.

Reference will now be made in detail to the preferred embodiments of the present invention, examples of which are illustrated in the accompanying drawings, wherein like reference numerals refer to like elements throughout.

Figure 2:
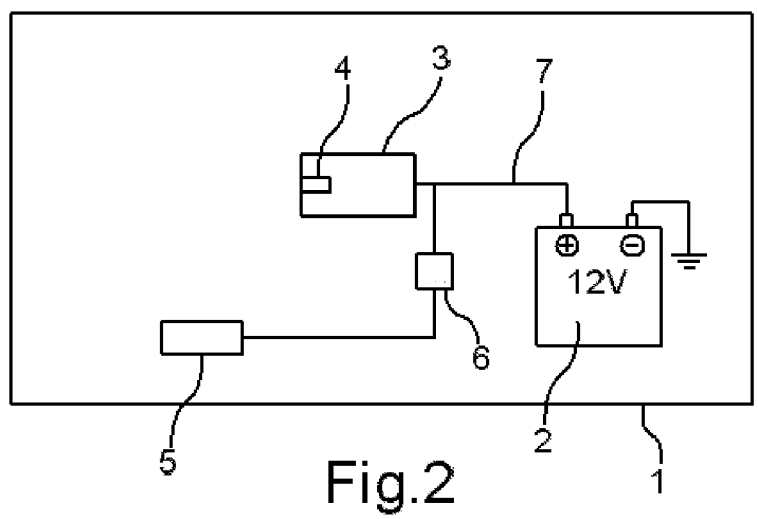
FIG. 2 shows a second embodiment of the vehicle.
Figure 3:
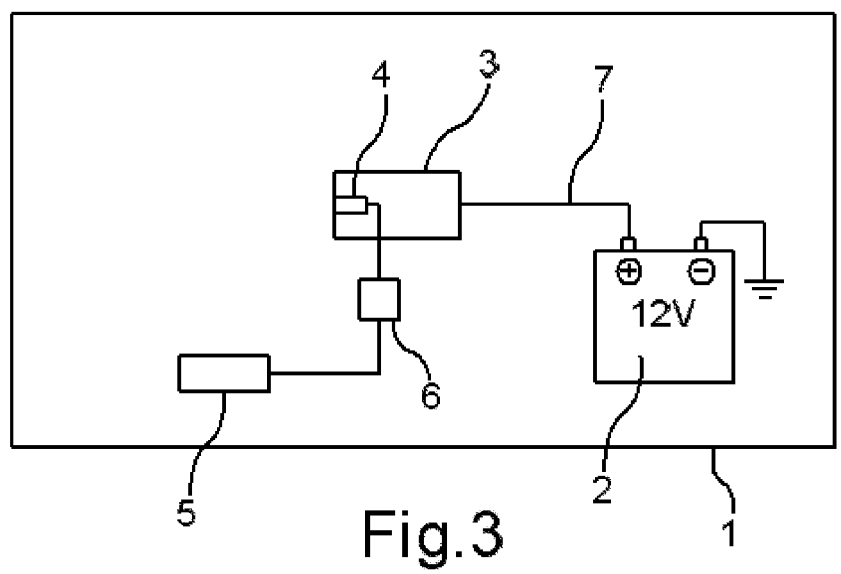
FIG. 3 shows a third embodiment of the vehicle.

FIGS. 1, 2 and 3 show, purely schematically, a vehicle 1, which has a rechargeable battery or a battery with an output voltage of approximately 12 volts as a voltage source 2. A first device 3 is electrically connected to this rechargeable battery 2 via a conductor 7. The device 3 is capable of generating a high voltage which is hazardous to human beings from the 12 volt input voltage.

In the examples shown, the element 4 of the first device 3 has this hazardously high voltage. It goes without saying that a hazardously high voltage can also be present in the device 3 itself.

In accordance with ISO 6469, components or devices in vehicles which have a voltage of over 60 volts DC or 25 volts AC are considered to be hazardous and are generally referred to as "high-voltage systems" (HV systems). Correspondingly, components or devices which have a voltage of less than or equal to 60 volts DC or less than or equal to 25 volts AC are considered nonhazardous.

The vehicle 1 has an accident sensor system 5. All of the sensors with which accident-typical configurations which do not arise during normal traveling operation of the vehicle 1 can be detected can be used for the accident sensor system 5. The accident sensor system 5 can therefore have, for example, an acceleration sensor, a rotation rate sensor and/or an airbag sensor.

For example, a front impact, a lateral impact or a rear impact can be detected by an acceleration sensor, and a vehicle rollover can be detected by a rotation rate sensor. The sensor system can possibly be used for triggering airbags for the accident sensor system 5.

Since there is not in all cases a necessary relationship between the criteria for the triggering of an airbag and the shutdown of live devices in a vehicle, it may be advantageous to provide a dedicated accident sensor system 5 for the shutdown of the electrical devices for the vehicle 1.

On output of the sensor signal, the element 4 of the first device 3 is switched to zero potential. In this case, either the element 4 can be switched to zero potential or the first device 3 itself. Furthermore, the proposed device includes also in this regard the conductor 7 being electrically disconnected from the voltage source 2.

In accordance with the exemplary embodiment shown in FIG. 1, the shutdown takes place by the high-voltage-generating device 3.

In accordance with the exemplary embodiments shown in FIGS. 2 and 3, the vehicle 1 furthermore has a control device 6. This control device is capable of switching the element 4 of the first device 3 to zero potential on output of the signal from the sensor device 5. In the exemplary embodiment shown in FIG. 2, the control device 6 interrupts, for example, the electrical conductor 7 between the rechargeable battery 2 and the device 3. And in accordance with the exemplary embodiment shown in FIG. 3, the control device 6 interrupts an electrical connection from/within the first device 3 to the element 4. An interruption can take place, for example, by a switch device, which is actuated by the control device 6.

A 230 V AC socket outlet device is mentioned here as an example of a first device 3 with an element 4. An AC socket outlet device which is fed by a 12 volt DC voltage source 2 has an inverter, which converts the 12 volt electric input direct current into an output alternating current with 50 Hertz and 230 volts. In the example described, the inverter would therefore be part of the first device 3. In addition to the inverter, an AC socket outlet device also has a socket outlet. Such a socket outlet is an example of an element 4 of the first device 3.

For example, the inverter can now be designed in such a way that it shuts itself down as soon as it receives the sensor signal from the accident sensor system 5 and therefore the socket outlet 4 is also switched to zero potential. Such an exemplary embodiment corresponds to that depicted in FIG. 1.

Likewise, there is also an embodiment in which a control device 6 receives the sensor signal from the accident sensor system 5 and then the element 4 is switched to zero potential by the control device 6. For this purpose, in the example described, the control device 6 can interrupt, for example, the electrical conductor 7 by actuating a switch correspondingly. Such an exemplary embodiment corresponds to that depicted in FIG. 2. Alternatively, the control device 6 can interrupt, for example, an electrical connection between the inverter and the socket outlet by a switch. Such an exemplary embodiment corresponds to that depicted in FIG. 3.

It is also possible in accordance with a further configuration for the inverter to be switched off directly by the control device 6, for example.

All conceivable combinations of the above-described possibilities for switching the element 4 to zero potential are of course also included in the options.

It is advantageous if, in the case of the vehicle 1, provision is made for the accident sensor system 5 and possibly the control device 6 to be activatable even when the ignition is switched off, and for the element 4 of the first device 3 to be automatically switchable to zero potential. A situation in which, in the case of a vehicle 1, the ignition is switched off or, in the case of an electric vehicle, the power supply to the drive motors is switched off, is present, for example, if the vehicle 1 is in a charging state or stationary air conditioning is taking place. Even in such situations, elements 4 in devices 3 of the vehicle 1 can have a hazardously high voltage in the event of a human being coming into touching contact therewith, and it is possible for an accident to take place at the hands of a third party.

The signal from the accident sensor system 5 can be transmitted in any suitable manner to the first device 3 or to the control device 6, for example in wired or wireless fashion. In accordance with a preferred embodiment, the vehicle 1 has a vehicle bus system (not illustrated in the Figs.), and the sensor signal can be transmitted over the vehicle bus system and can be used for automatically switching the element 4 of the first device 3 to zero potential.

A vehicle bus system has the advantage that, in principle, all devices connected thereto can read and use the data transported on the vehicle bus system. Therefore, given the presence of a vehicle bus system, signaling of the accident sensor system 5 only needs to be provided once on the vehicle bus system and is available to a plurality of devices 3 or control devices 6.

Often, a vehicle has not only a voltage supply with a low voltage but also a voltage supply with a high voltage, in each case with devices connected thereto which have a voltage which is hazardous to a human being in the event of such a human being coming into touching contact therewith. Therefore, in the case of a vehicle 1 which also has a second device, which has at least one element which can have an electric voltage which is hazardous to a human being in the event of such a human being coming into touching contact therewith, and which is electrically connected to a high-voltage conductor with an electric voltage of greater than 60 volts DC or greater than 25 volts AC, it is advantageous if, on output of the sensor signal, the element of the second device can also automatically be switched to zero potential.

All possible embodiments which are described in respect of the first device and the element provided in this case are of course also applicable in respect of the second device and the element provided in that case and included.

By way of summary, the proposals relate to a technical solution for the safe shutdown of high-voltage-generating devices in vehicles, in particular in motor vehicles, hybrid vehicles and electric vehicles.

In the meantime, an increasing number of components and devices which operate on high voltages are used in vehicles. The most conventional of these components are HV components such as, for example, the power electronics or an electrical air-conditioner compressor in a hybrid or electric vehicle.

These components, which are supplied power by an HV battery, are shut down automatically in the event of an accident (crash) by the deactivation of the HV battery (disconnection of the HV battery by corresponding switching devices). This results in components which no longer conduct any voltage after an accident and therefore do not pose any hazard to rescue workers and occupants.

Until now, however, components which generate high voltages (greater than 60 volts DC or greater than 25 volts AC) from a low voltage (for example 12 volts DC) have not been shut down in the event of an accident, although a human being coming into touching contact with a component which has such high voltages is hazardous to such a human being. This disadvantage of the related art is eliminated.

Most control devices of a vehicle are connected to a vehicle bus system. On identification of an accident (vehicle crash) by a crash sensor system or crash control devices, special signals (data) are passed on to the vehicle bus systems, which signals can be used by many control devices in order to bring about a desired response.

It is therefore a preferred embodiment to make the existing special signals (data) available to components, or evaluate said signals in components, which generate high voltages from a low-voltage supply (for example 12 volts DC) as well. After or in the event of an accident (vehicle crash), these components can then be deactivated or switched to zero potential. This can take place, for example, directly in the high-voltage-generating device (component, control device) or in another control device, which is capable of shutting down the relevant high-voltage-generating device.

The safety of occupants and of rescue workers after an accident involving a vehicle is increased.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A hybrid or electric motor vehicle comprising:
 a low-voltage conductor having a low voltage of less than or equal to 60 volts DC or less than or equal to 25 volts AC;
 a first device electrically connected to the low-voltage conductor, to generate a high voltage from the low voltage present on the low-voltage conductor such that the first device has an element, which can have an electric voltage of greater than 60 volts DC or greater than 25 volts AC which is hazardous to a human being if the human comes into touching contact with the element; and an accident sensor system, which outputs a sensor signal if an accident is detected, the sensor signal causing the element of the first device to be automatically switched to zero potential.

2. The vehicle as claimed in claim 1, wherein the low-voltage conductor is connected to a low voltage battery, and the first device comprises an inverter.

3. The vehicle as claimed and claim 1, wherein the element of the first device is connected to at least one of an ionizer and a high voltage socket outlet.

4. The vehicle as claimed in claim 1, wherein the low voltage of the low-voltage conductor is less than or equal to 24 volts DC.

5. The vehicle as claimed in claim 1, wherein the low voltage of the low-voltage conductor is less than or equal to 12 volts DC.

6. The vehicle as claimed in claim 1, wherein the accident sensor system has at least one sensor selected from the group consisting of an acceleration sensor, a rotation rate sensor and an airbag sensor.

7. The vehicle has claimed in claim 1, wherein the accident sensor system comprises a lateral impact acceleration sensor and a rotation rate sensor.

8. The vehicle as claim didn't claim 1, wherein the vehicle has an airbag sensor system separate from the accident sensor system, and the accident sensor system comprises a lateral impact acceleration sensor and a rotation rate sensor.

9. The vehicle as claimed in claim 1, wherein the first device is designed in such a way that it can automatically switch the element of the first device to zero potential on output of the sensor signal.

10. The vehicle as claimed in claim 1, wherein the first device comprises an inverter, and the inverter is automatically switched off by the sensor signal.

11. The vehicle as claimed in claim 1, wherein the vehicle further comprises a control device to automatically switch the element of the first device to zero potential on output of the sensor signal.

12. The vehicle as claimed in claim 1, wherein the first device comprises a high-voltage generating device, and the element of the first device is disconnected from the high-voltage generating device by the sensor signal.

13. The vehicle as claimed in claim 1, wherein the low-voltage conductor is connected to a voltage source, and the low-voltage conductor is automatically disconnected from the voltage source by the sensor signal.

14. The vehicle as claimed in claim 1, wherein the accident sensor system is active even when a vehicle ignition is switched off, such that if an accident is detected when the ignition is switched off, the element of the first device is automatically switched to zero potential.

15. The vehicle as claimed in claim 1, wherein the vehicle further comprises a vehicle bus system to transmit the sensor signal for automatically switching the element of the first device to zero potential.

16. The vehicle as claimed in claim 1, further comprising:
a high-voltage conductor having an electric voltage of greater than 60 volts DC or greater than 25 volts AC; and
a second device electrically connected to the high-voltage conductor, the second device having a component, which can have an electric voltage which is hazardous to a human being if the human being comes into touching contact with the component of the second device, the second device being connected to the accident sensor system such that if the accident sensor system outputs the sensor signal, the component of the second device is automatically switched to zero potential.

17. The vehicle as claimed in claim 16, wherein the low-voltage conductor is connected to a low voltage battery,
the first device comprises an inverter,
the high-voltage conductor is connected to a high-voltage battery, and
an electric motor drive device is connected to the second device.

18. The vehicle as claimed in claim 16, wherein the component of the second device is connected to a vehicle air conditioner which is active even when a vehicle ignition is switched off, and
the accident sensor system is active even when the ignition is switched off, such that if an accident is detected when the ignition is switched off, the component of the second device is automatically switched to zero potential.

19. A method for switching to zero potential a first device of a hybrid or electric motor vehicle, the method comprising:
sensing an accident with an accident sensor system of the motor vehicle;
outputting a sensor signal from the accident sensor system if an accident is sensed; and
automatically switching an element configured to have a high electric voltage of greater than 60 volts DC or greater than 25 volts AC to zero potential when the sensor signal is output,
wherein
the element is part of a first device which is electrically connected to a low-voltage conductor, which has a low voltage of less than or equal to 60 volts DC or less than or equal to 25 volts AC, and
the first device generates the high electric voltage from the low voltage present on the low-voltage conductor.

* * * * *